United States Patent [19]

Mangialardi

[11] 3,728,047
[45] Apr. 17, 1973

[54] SOLIDS ACCUMULATOR PUMP SYSTEM

[75] Inventor: John K. Mangialardi, King of Prussia, Pa.

[73] Assignee: The United States of America as represented by the United States Atomic Energy Commission, Washington, D.C.

[22] Filed: Sept. 13, 1971

[21] Appl. No.: 179,740

[52] U.S. Cl. ................................417/488, 417/511
[51] Int. Cl. ...............................................F04b 19/04
[58] Field of Search.....................417/486, 427, 428, 417/275, 511, 383–388

[56] References Cited
UNITED STATES PATENTS

| 3,168,045 | 2/1965 | Sebastiani | 417/383 |
| 3,030,892 | 4/1962 | Piccardo | 417/383 |
| 2,678,006 | 5/1954 | Gray | 417/511 X |

Primary Examiner—William L. Freeh
Assistant Examiner—Leonard Smith
Attorney—Roland A. Anderson

[57] ABSTRACT

A solid waste pumping system for use with a process operating at a vacuum in which a reciprocating pump moves the solid waste into an accumulator having a floating piston. The piston discharges the waste by exposing the other side of the piston to ambient pressure.

3 Claims, 2 Drawing Figures

INVENTOR.
John K. Mangialardi

SOLIDS ACCUMULATOR PUMP SYSTEM

SOURCE OF THE INVENTION

The invention described herein was made in the course of, or under a contract with the U. S. Atomic Energy Commission.

BACKGROUND OF THE INVENTION

In the operation of waste management systems of the type which produces waste due to such processes as condensation, sedimentation, centrifugation, or precipitation, one of the difficult problems which arises is that of removing the waste from an evacuated process chamber efficiently and without interfering with the operation of the process itself.

An example of a waste management system in which this problem arises is that of the recycling of human wastes in a closed system such as in a space ship. The problem also arises when human wastes are to be treated before disposal, such as in a sewage treatment plant, in the handling of fecal wastes aboard aircraft, boats, and other vehicles, especially where processing occurs in evacuated chambers.

Heretofore, the removal of fecal and similar slurries involved a batch process in which the treatment process was periodically halted so that the waste residue could be removed. Pumping of the waste also typically required high power and/or pressure and elaborate pumping apparatus.

SUMMARY OF THE INVENTION

The present invention overcomes many of the difficulties presented up to now with the removal of waste slowly accumulating in a process chamber under reduced pressure. In accordance with a preferred embodiment of this invention a piston-valve is located in a trap where the waste is permitted to accumulate from the process chamber. The piston-valve cyclically pumps the waste into a variable volume accumulator chamber under the control of a floating piston. The pressure differential between atmospheric and process chamber pressure provides the force for moving the waste from the accumulation chamber into the discharge pipe which is also under reduced pressure.

It is thus a principal object of this invention to provide apparatus for the continuous removal of a waste from a process chamber under reduced pressure.

Other objects and advantages of this invention will become obvious from the following description of preferred embodiments of this invention.

BRIEF DESCRIPTION OF THE INVENTION

DESCRIPTION OF THE PREFERRED EMBODIMENT

Figure 1:
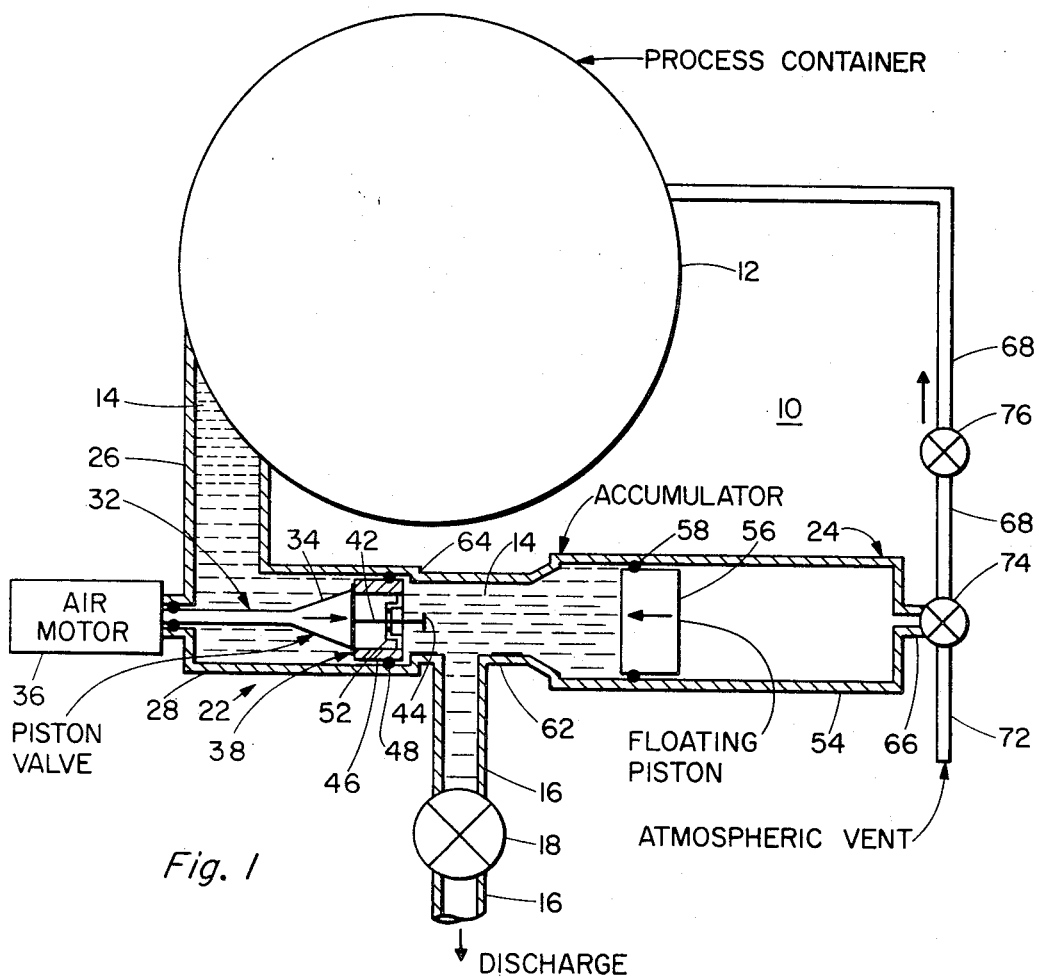
FIG. 1 is a partially diagrammatic view of a preferred embodiment of this invention.
Figure 2:
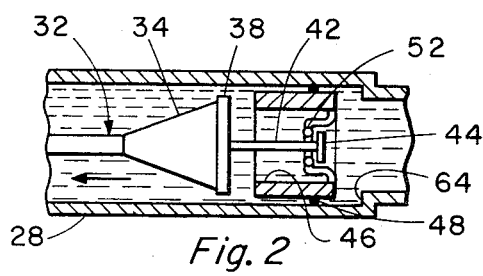
FIG. 2 shows a detail of the piston valve during a withdrawal stroke.

Referring to FIGS. 1 and 2, solids accumulator pump system 10 is used with process container 12 for the removal of waste 14 and its discharge through pipe 16 and discharge valve 18. The chamber within process container 12 would be, during normal operation, at a pressure less than ambient such as would exist in a low pressure evaporation chamber. In the arrangement shown, discharge is also into a region of reduced pressure.

System 10 consists of a piston valve assembly 22, an accumulator 24, and discharge pipe 16 with discharge valve 18. Piston valve assembly 22 is connected by way of a manifold 26 to process container 12 to receive waste 14 slowly accumulating within process chamber 12 and comprises a cylinder 28 into which extends a piston valve 32 which terminates at one end in an expanded section 34 and at its opposite end, outside of cylinder 28, terminates in an air motor 36. A gasket 38 is attached to the exposed flat surface of expanded section 34. A pick-up shaft 42 having a catch 44 extends out from the exposed flat surface of expanded section 34. A slidable sleeve 46 within cylinder 28 is provided with a seal 48 and a ring 52 supported in any convenient fashion from sleeve 46 to accommodate independent movement of shaft 42. When moving to the left, catch 44 will engage with ring 52 and sleeve 46 will be forced to follow.

Accumulator 24 consists of a cylinder 54 containing a floating piston 56 with a seal ring 58. Cylinders 54 and 28 are joined by a pipe 62 of reduced diameter thereby limiting the movements of piston 56 and sleeve 46. A shoulder 64 acts as a stop for the forward or right movement of sleeve 46. It will be noted that waste 14 normally fills accumulator 24 to the left of piston 56, within pipe 62, cylinder 28, and manifold 26. Accumulator 24 to the right of piston 56 is connected by way of a pipe 66 to either the interior of process container 12 by way of a pipe 68 or vented to atmosphere by way of a pipe 72. A two-way valve 74 permits either connection to be made. A check valve 76 in pipe 68 open in the direction shown by the arrow permits sealing of process container 12.

In the operation of the apparatus just described, waste accumulating within container 12 empties into manifold 26 and fills the various spaces up to piston 56 and down to discharge valve 18. Starting from the position of sleeve 46 against shoulder 64, and valve 74 connecting pipe 66 to pipe 68, air motor 36 is actuated to withdraw (move to the left) piston valve 32. As best seen in FIG. 2, catch 44 engages ring 52 and sleeve 46 follows piston valve 32. Pipe 66 is opened to pipe 68 by valve 74. It will be seen that during this movement waste is not moved as the waste flows around gasket 38 through sleeve 46 while the latter moves. When the withdrawal movement ends at the end of the stroke, air motor 36 is energized to move piston valve 32 in a forward direction (to the right). Gasket 38 closes up the opening to sleeve 46 (as seen in FIG. 1) and movement of sleeve 46 together with piston valve 32 pushes waste to the right. As piston 56 is unloaded on the opposite side from the waste by being open to the interior of container 12, it moves to the right under the influence of the pressure transmitted by the waste. When the movement of sleeve 46 ends as it reaches shoulder 64, discharge valve 18 is opened, valve 74 is turned to vent pipe 66 to atmosphere. As atmospheric pressure exceeds the discharge pressure and the process pressure within container 12 and to the left of floating piston 56, the latter will move to the left, causing the waste to discharge through pipe 16. In practice, there will usually be several strokes of piston valve 32 for one discharge through pipe, as accumulator 24 has a capacity appreciably longer then the displacement of one stroke of piston valve 32.

When piston 56 reaches the left end of accumulator 24, discharge valve 18 closes and valve 74 is rotated to expose accumulator 24 to process pressure, through pipe 68.

Then air motor 36 is activated to begin once again the withdrawal motion of piston valve 32.

As already noted, discharge from pipe 16 in the arrangement shown is at less than atmospheric pressure. However, if it is desired to discharge the waste into a region at some other pressure such as atmospheric, pipe 72 would be vented to a source of higher pressure.

It will be seen that in the arrangement described pumping of the waste can be conducted intermittently, when it accumulates very slowly, or the pumping cycle can be run continuously. Under any mode of operation, however, the described system does not interfere with the process within container 12. It should be noted that waste 14 may be a sludge, slurry or some other partially or completely dried substantially solid material.

A feature of this invention is that the only external power source required is that in air motor 36 which can be activated by a supply of high pressure air as is understood in the art. Power requirements for motor 36 are in any event minimal as piston 56 is unloaded during advance of piston valve 32 and during withdrawal there is even less load. It should also be noted that the apparatus is relatively quiet.

What is claimed is:

1. A pumping system for discharging solid waste from a process container under vacuum comprising:
   a. pump cylinder means containing piston valve means for pumping solid waste during forward stroke thereof;
   b. manifold means extending from said container to said pump cylinder means for permitting said solid waste to flow into said pump cylinder means;
   c. accumulator cylinder means containing a piston for reciprocating movement therein;
   d. conduit means interconnecting said pump cylinder means and said accumulator cylinder means, said conduit means carrying solid waste from said pump cylinder means into said accumulator cylinder means during the forward stroke of said piston valve means, the side of said accumulator piston away from said waste exposed to the interior pressure of said container to permit said accumulator piston to retract to accommodate said waste;
   e. discharge means including discharge valve means for discharging solid waste from said conduit means; and
   f. means for reversing the movement of said accumulator piston at the end of the forward stroke of said piston valve means for pushing said solid waste out of said accumulator cylinder means into said conduit means and out through said discharge means, said discharge valve means being open during the reverse movement of said accumulator piston.

2. The pumping system of claim 1 in which the means for reversing the movement of said accumulator piston includes a source of pressure and vent means to expose the side of said accumulator piston away from said waste to said source of pressure.

3. A pumping system for discharging solid waste from a process container under vacuum comprising:
   a. pump cylinder means containing piston valve means for pumping solid waste during forward stroke thereof;
   b. manifold means extending from said container to said pump cylinder means for permitting said solid waste to flow into said pump cylinder means;
   c. accumulator cylinder means containing a piston for reciprocating movement therein;
   d. conduit means interconnecting said pump cylinder means and said accumulator cylinder means, said conduit means carrying solid waste from said pump cylinder means into said accumulator cylinder means during the forward stroke of said piston valve means, the side of said accumulator piston away from said waste exposed to the interior pressure of said container to permit said accumulator piston to retract to accommodate said waste;
   e. discharge means including discharge valve means for discharging solid waste from said conduit means; and
   f. means for reversing the movement of said accumulator piston at the end of the forward stroke of said piston valve means for pushing said solid waste out of said accumulator cylinder means into said conduit means and out through said discharge means, said discharge valve means being open during the reverse movement of said accumulator piston;
   g. the means for reversing the movement of said accumulation piston including a source of pressure and vent means to expose the side of said accumulator piston away from said waste to said source of pressure instead of said container; and
   h. the piston valve means including a slideable sleeve and a piston for sealing off said sleeve during the forward stroke and permitting waste flow through said sleeve during the reverse stroke of said piston valve means.

* * * * *